June 12, 1962 D. T. FITZMAURICE ET AL 3,038,809
PROCESS FOR PRODUCING STARCH JELLIES
Filed April 25, 1960 2 Sheets-Sheet 1

DENNIS T. FITZMAURICE INVENTORS
CHARLES F. WEINREICH
BY James C. Nemmers
S. Manning Giles
ATTORNEYS June 12, 1962  D. T. FITZMAURICE ET AL  3,038,809
PROCESS FOR PRODUCING STARCH JELLIES
Filed April 25, 1960  2 Sheets-Sheet 2

DENNIS T. FITZMAURICE  INVENTORS
CHARLES F. WEINREICH
BY
ATTORNEYS 3,038,809
PROCESS FOR PRODUCING STARCH JELLIES
Dennis T. Fitzmaurice and Charles F. Weinreich, Cedar Rapids, Iowa, assignors to Cherry-Burrell Corporation, Cedar Rapids, Iowa, a corporation of Delaware
Filed Apr. 25, 1960, Ser. No. 24,410
2 Claims. (Cl. 99—134)

This invention relates generally to a cooking process and more particularly to an improved process for producing starch jelly confections.

Until relatively recent times, the manufacture of starch jelly confections was carried out in large kettles. This was a batch-type cooking operation accomplished at atmospheric pressure. Then several years ago, there was developed a continuous cooking process carried out at super-atmospheric pressure. Within a relatively short time, continuous pressure cooking of starch jellies has become almost unanimously adopted by the confectionery manufacturing industry and several continuous processes have been developed in order to improve the quality of the final product. However, to the best of our knowledge none of the prior art developments have been able to combine in an economical process high flow rates and accurate control of the final properties of the product. With our novel process we believe we can obtain all these advantages in a single process without sacrificing other known advantages of the prior art processes.

Accordingly, it is a primary object of our invention to provide a continuous cooking process which can be accurately controlled to produce a starch jelly confection having superior characteristics.

It is another object of our invention to provide a continuous process for manufacturing starch jellies in reasonably unlimited capacities or flow rates.

Another object of our invention is the provision of a continuous cooking process in which the starch slurry is thoroughly and uniformly cooked regardless of the rate at which it is processed.

A further object of our invention is in the provision of a continuous cooking process for starch jellies that may be accurately controlled automatically, thereby eliminating nonuniformity of the final product.

It is a still further object of our invention to provide a continuous cooking process for starch jellies that is both economical to practice and one that may be carried out on a relatively simple and inexpensive form of apparatus.

These and other objects of our invention will be readily apparent from consideration of the following description taken in connection with the accompanying drawings in which.

Figure 1:
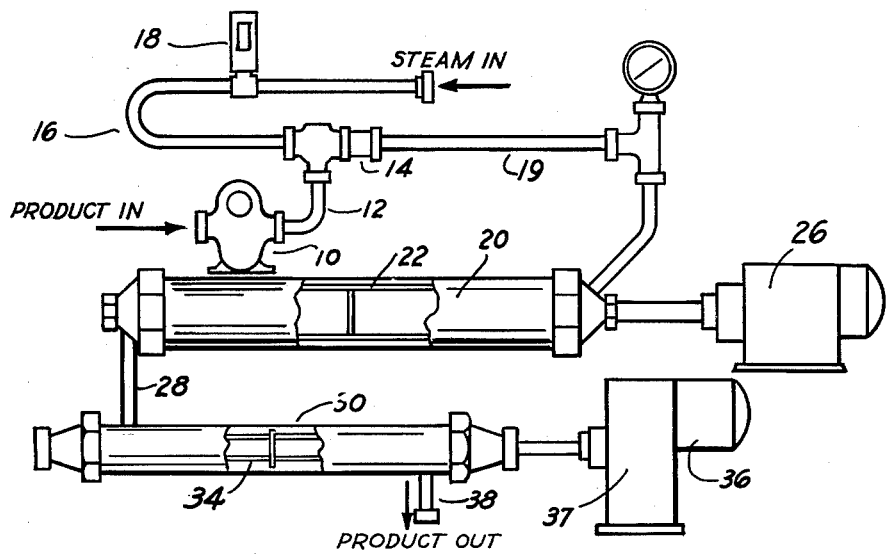
FIGURE 1 is a diagrammatic view illustrating the general arrangement of an apparatus suitable for carrying out our novel process.

The illustrated apparatus for carrying out the process of our invention includes a product pump 10, preferably of the positive displacement type, that feeds a starch slurry of the desired composition into a pipe line 12 leading to a stream injection heater indicated generally by the reference numeral 14. Steam is admitted to the injection heater 14 through line 16, the steam being regulated by regulator 18 in line 16. The steam and slurry are thoroughly intermixed in heater 14 and discharged into line 19. Some steam is condensed in the starch slurry and the slurry is instantaneously heated to the desired temperature which, in the case of starch jellies, we prefer to be in the range of about 240° to about 300° F. Since some steam is condensed in the slurry, the water content of the make-up slurry should be less than the desired moisture content of the final product.

The heated slurry is then rapidly passed into an elongated cylinder 20 whose dimensions depend upon the desired cooking time of the slurry. In other words, elongated cylinder 20 acts as a holding tube through which the slurry heated in the injection heater 14 is passed and cooked. We have found that the heat loss from this holding tube 20 is almost negligible and therefore the heated slurry is maintained at substantially the temperature attained in the injection heater 14. The cooking temperature is preferably controlled by suitable temperature responsive regulating means (not shown) located at the discharge end of the cylinder 20. This temperature responsive means controls the amount and temperature of the steam admitted to heater 14. Thus, the slurry is cooked at the desired temperature from the time it is mixed with steam in the heater 14 until it is discharged from the holding tube 20. We have found that this time period should be at least two minutes to thoroughly cook the starch and obtain a superior product.

Figures 3, 4:
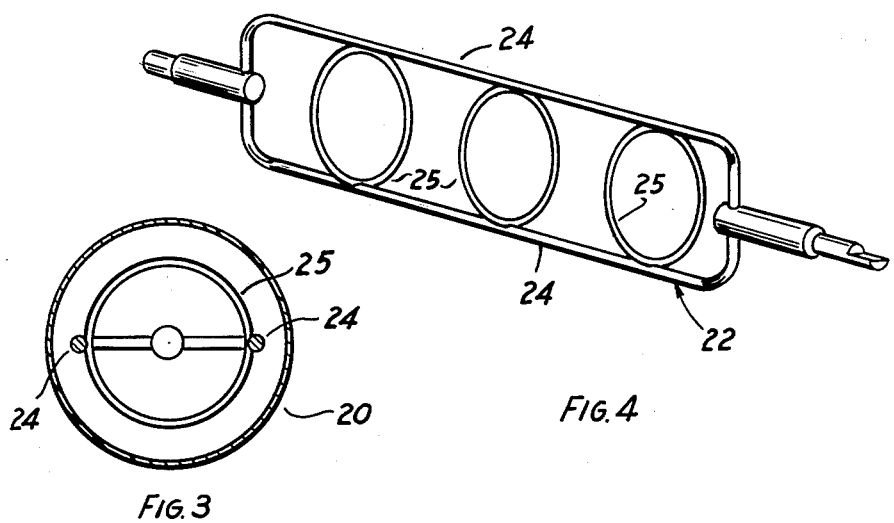
FIGURE 3 is a sectional view of the holding chamber that is a part of said appartus.
FIGURE 4 is a perspective view of the holding chamber agitator.
Figures 5, 6:
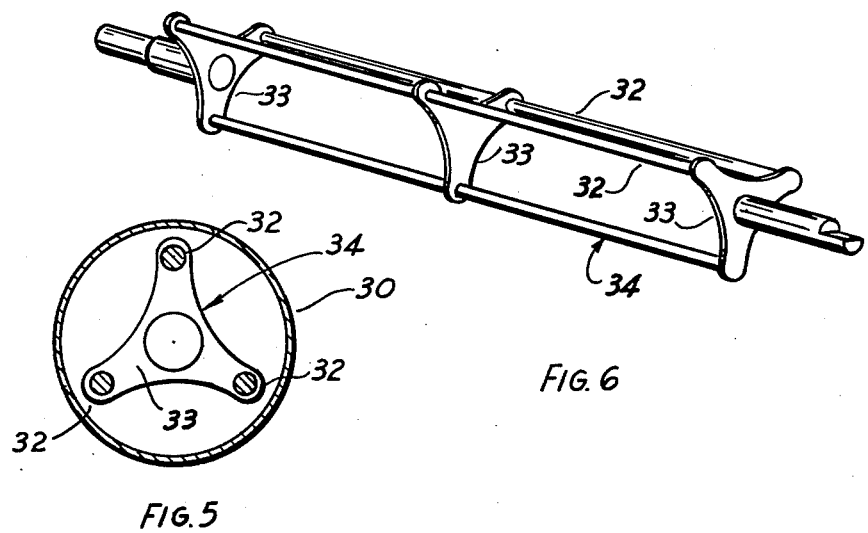
FIGURE 5 is a sectional view of the mixing chamber.
FIGURE 6 is a perspective view of the mixing chamber agitator.

As best seen in FIGURES 3 and 4, the holding tube 20 is provided with an agitator 22 consisting of a pair of longitudinal bars 24 inter-connected by a series of spaced rings 25. The agitator 22 is rotatably driven by a motor 26. Therefore, while the slurry is being passed through the holding tube 20, it is constantly mixed at an intensity which we prefer to maintain relatively low. This intensity should be high enough, however, to prevent "tunneling" or "coring" of the slurry but insufficient to cause bursting or breaking of the starch granules in the slurry. Mixing by the agitator 22 is considered necessary to insure that all of the starch is cooked for the same amount of time. Thus, use of a holding tube 20 with an agitator 22 substantially eliminates the possibility of portions of the starch being either uncooked or overcooked.

The cooked slurry is discharged from the holding tube 20 into a pipe line 28 leading to a second elongated cylinder 30 that is somewhat smaller in diameter than the holding tube 20. We prefer to call this second elongated cylinder 30 the mixing tube. Similar to holding tube 20, the mixing tube 30 contains a plurality of elongated bars 32 interconnected by spacers 33 that comprise an agitator indicated generally by reference numeral 34. This agitator 34 is rotatably driven by a motor 36 at a relatively high rate of speed, much higher than agitator 22, thereby giving an agitation intensity sufficient to rupture the desired percentage of starch granules. For this purpose agitator 34 is preferably driven by motor 36 through a variable drive 37 so that the speed of the agitator 34 and thus the agitation intensity may be varied.

The final characteristics of starch jelly confections depend primarily on the condition of the starch granules themselves. The starch granules when mixed with water and heated will swell and it is desirable to swell or cook all of them almost to the point where they will burst. If all the starch is cooked to this point the viscosity of the slurry will be at a peak indicating maximum gelatinization and the product will have good gel strength and the desired clear appearance. Then to give the final product the desired consistency, some of these swollen granules must be broken up. This we prefer to accomplish in the mixing chamber 30 by controlled agitation of the cooked slurry. Because of the wide variety of starch jellies and because each confectionery manufacturer usually requires different final properties in his product, we have provided the variable drive 37 on the motor 36 to provide flexibility in our process.

After agitation in the mixing tube 30, the slurry is discharged through the product outlet 38 to mixing vats for the addition of other elements, or it may be passed into molds to gel or may be cooled in suitable heat exchange equipment. The treatment of the cooked slurry after its discharge from the mixing chamber 30 depends on the final product being manufactured and forms no part of our novel process.

Suitable automatic controls for the process may be provided and mounted on a central control panel (not shown). If desired, the entire apparatus for carrying out our novel process may be mounted on a suitable base (not shown) to simplify its installation.

Figure 2:
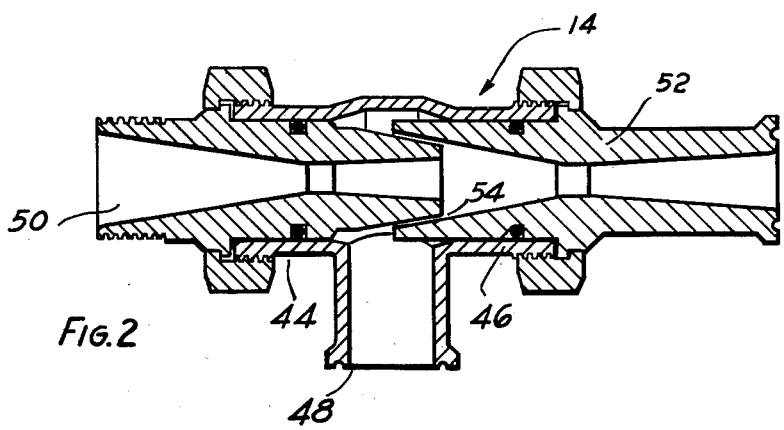
FIGURE 2 is a sectional view of the steam injection heater that forms a part of the apparatus shown in FIGURE 1.

Referring now to FIGURE 2, the steam injection heater 14, shown in FIGURE 2, is a slightly modified version of the injection heater that forms the basis of U.S. Patent Application Serial No. 804,403, filed April 6, 1959, by Ralph H. Triem, this application being assigned to the same assignee as is the present application. As shown in FIGURE 2, the injection heater 14 is generally T-shaped and has two ends, 44 and 46, and a branch 48. Fitted in the end 44, is a steam nozzle 50. This nozzle 50 is preferably of the converging-diverging type and has its inlet end threaded for connection to the steam supply line 16. The nozzle 50 has its outlet end fitted inside the inlet end of a second nozzle 52 and a relatively small annular space 54 is formed between the outlet end of nozzle 50 and the inlet end of nozzle 52. The starch slurry is introduced into the branch 48 of heater 14 and steam is introduced into the end 44 through nozzle 50. The slurry will flow through the small annular space 54 and be mixed with the high velocity steam flowing from the outlet end of nozzle 50, the steam-slurry mixture then being forced out the nozzle 52 into line 19 at a high velocity. The injection heater 14 is capable of instantly heating the product to temperatures in excess of 300°, the steam flow being automatically regulated by valve 18, according to the desired cooking temperature.

When the steam is mixed with the slurry in the heater 14, violent agitation occurs instantaneously, and, with proper control of the steam flow, this agitation is accomplished before the starch granules absorb the steam as moisture and begin to swell. The agitation occurring in heater 14 therefore provides for uniform, thorough and instantaneous heating of the slurry to a temperature at which the starch granules will be swollen almost to the point of bursting without actually bursting.

The passing of the heated slurry from the injection heater 14 into the holding tube 20, where it is gently mixed, assures cooking of substantially all the starch for a uniform period of time without the hazard of overcooking with the resulting bursting of the starch granules. It is the purpose of the mixing tube 30 after cooking of the starch to rupture the desired number of starch granules. In this way, accurate control of the characteristics of the final product is possible and we can thereby produce a superior product. We have been able in our process to couple with these advantages high flow rates, economy of initial investment in apparatus required to practice the process, and economy in operation.

Furthermore, since our process involves continuous closed circuit cooking, the possibility of contamination of the product is practically eliminated. We prefer that the apparatus be of a sanitary design and therefore capable of being quickly and easily cleaned.

Having thus described our invention, it will be apparent to those skilled in the art that various modifications may be made in our novel process without departing from the principles thereof. It is our intentions that such revisions and modifications will be included within the scope of the following claims.

We claim:

1. A process for producing starch jelly comprising: Preparing a slurry of starch, sugar, and water; continuously feeding said slurry into a heating zone maintained above atmospheric pressure; instantaneously heating said slurry by continuously injecting steam into said slurry in said zone; holding said slurry at the desired cooking temperature for a period of time sufficient to allow substantially all the starch granules in said slurry to swell; gently agitating said slurry during the entire time it is held at the cooking temperature; passing the cooked slurry into a chamber containing an agitator; and rupturing some of said starch granules by controllably agitating said slurry in said chamber.

2. A process for producing starch jelly comprising: Preparing a slurry of starch, sugar, and water; continuously feeding said slurry into a heating zone maintained above atmospheric pressure; instantaneously heating said slurry to a cooking temperature above about 240° F. by continuously injecting steam into said slurry in said zone; holding said slurry at the cooking temperature for at least about two minutes to allow all of the starch granules in said slurry to swell; gently agitating said slurry during the entire time it is held at the cooking temperature; passing the cooked slurry into a chamber containing an agitator; and rupturing some of said starch granules by controllably agitating said slurry in said chamber.

References Cited in the file of this patent

UNITED STATES PATENTS

| | | |
|---|---|---|
| 2,678,276 | North | May 11, 1954 |
| 2,726,960 | Bolanowski | Dec. 13, 1955 |